Patented Oct. 26, 1926.

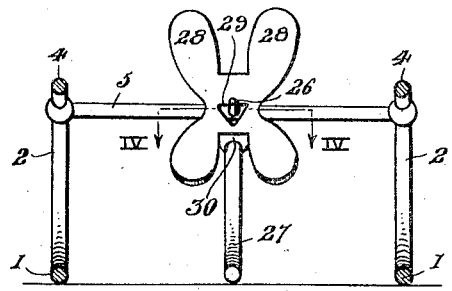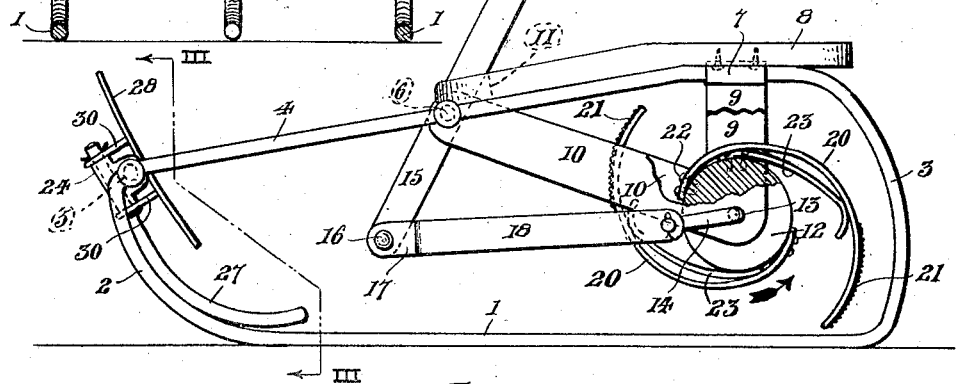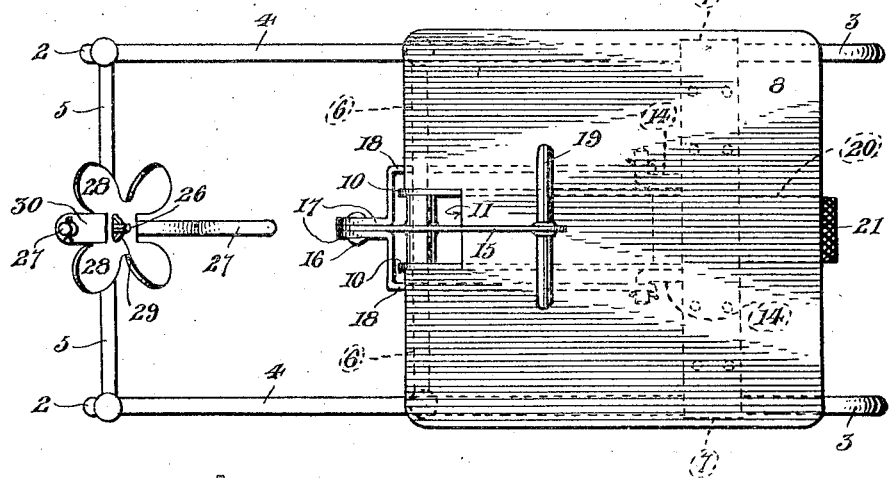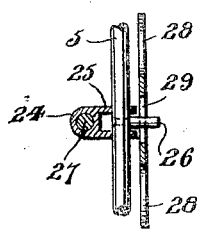

1,604,245

UNITED STATES PATENT OFFICE.

WALTER A. TAYLOR AND JOHN BOOSH, OF CLEVELAND, OHIO; SAID BOOSH ASSIGNOR TO SAID TAYLOR.

MANUALLY-PROPELLED SLED.

Application filed November 6, 1924. Serial No. 748,221.

This invention relates to certain new and useful improvements in manually propelled sleds, wherein a ground engaging foot movable in a circular path is manually operated thru the medium of lever and link devices to effect the forward propulsion of the sled.

A further object of the invention is to provide in a manually propelled sled of the type above set forth, the provision of a foot operated combined steering and brake device for controlling the direction of movement and bringing the sled to a stop.

With the above and other objects in view that will become apparent as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view, partly shown in section of a manually propelled sled constructed in accordance with the present invention showing the manually operated lever and link devices for moving the ground engaging propelling foot in a circular path, Figure 2 is a top plan view of the sled, Figure 3 is a vertical cross-sectional view taken on line III—III of Fig. 1 showing the steering and brake device, and Figure 4 is a detail sectional view taken on line IV—IV of Fig. 3.

The sled embodies a frame structure having side members, each side member being integrally formed and embodying a base runner 1 curved upwardly as at 2 at its forward end while the rear end thereof is curved upwardly as at 3 the upper ends of the curved portions joining with an upper forwardly declined rail 4 as shown in Fig. 1. The side members are connected by a forward cross rod 5, an intermediate cross rod 6 and a rear cross bar 7 in any well known manner, not shown. A seat board 8 is supported on the upper rails 4 and is secured to the intermediate cross rod 6 and the rear cross bar 7.

The propelling device for the sled includes a hanger bracket having side arms 9 depending centrally from the cross bar 7 with forwardly and upwardly directed brace arms 10 extending from the lower ends of the depending arms 9 to the cross rod 6 and attached thereto within the cutaway portion 11 at the forward central edge of the seat 9. A disk 12 is journalled between the lower ends of the depending arms 9 upon the central portion of the crank shaft 13, the shaft 13 carrying a crank arm 14 at each end that extends in the same direction. An operating lever 15 is pivoted intermediate its ends as at 16 upon the bracket 17 that is carried by the intermediate cross rod 6 and the forward edge of the seat 8, the cutaway portion 11 in the forward edge of the seat providing a clearance for movement of the operating lever. A pair of links 18 connects the lower end of the operating lever 15 to the two crank arms 14 of the shaft 13 so that pivotal movement of the lever 15 will effect a counter-clockwise rotation of the disk 12, it being noted that the upper end of the operating lever 15 is provided with a cross handle bar 19. Ground engaging feet 20 in the form of spring arms having roughened gripping face 21 and of arcuate formation are secured as at 22 to the peripheral edge of the disk 12, and to increase the purchase thereof at the time of its ground engaging position, a second spring arm 23 secured to the disk 12 engages the ground engaging foot 20 at a point spaced outwardly of the disk as shown in Fig. 1.

To provide for the steering and braking of the sled, the forward cross rod 5 supports a block 24 intermediate its ends thru the medium of apertured ears 25, transverse sliding movement of the block upon the cross rod being limited by the pin 26 projecting at right angles from the cross rod between the mounting ears 25. An arcuate rod 27 is secured in the block 24 and depends therefrom as clearly illustrated in Fig. 1. To accomplish the gripping movement of the rod 27, a foot plate is mounted upon the block 24 and includes side portions 28 to be engaged by the feet of the operator and having a central opening 29 thru which the pin 26 extends. A pair of apertured ears 30 are formed integrally with and directed forwardly of the foot plate 28 and fixedly receive in their apertures the rod 27 which is held against downward removal by a cotter pin.

From the above detail description of the device, it is believed that construction and operation thereof will at once be apparent, it being noted that a child upon the seat 8 places its feet upon the side portions of the plate 28 and by slightly tilting the forward edge of the plate 28, the block 24 is moved upon the cross rod 5 with the curved arm elevated from the ground line as illustrated in Fig. 1. The lever 15 is then operated by the handle bar 19 and the link connection with the crank arms 14 of the shaft 13 effects counter-clockwise rotation of the disk 12 and a circularly swinging movement of the ground engaging feet 20 which causes the sled to be forwardly propelled in a substantially even manner. The feet assume the position shown in Fig. 1, when coasting. When it is desired to steer the sled to either the right or left, the rod 27 is lowered by pressing upon the lower edge of the foot plate 28 causing the mounting ears 25 of the block 24 to pivot upon the cross rod 5 while lateral movement of the rod 27 is accomplished by increasing the pressure at either side of the foot plate 28, causing the rod 27 to rotate within the block 24. In stopping the sled, the rod 27 is depressed in a manner as will be evident from an inspection of Fig. 1 which will bring the sled to a stop when the rod 27 engages the ground.

While there is herein shown and described the preferred embodiment of the present invention, it is nevertheless to be understood that minor changes may be made therein without departing from the spirit and scope of the invention as claimed.

What is claimed as new is:—

1. In a manually propelled sled, a pair of runners, a seat mounted on the runners, a hanger depending from the seat, a crank shaft journalled in the hanger, lever and link devices attached to the crank shaft for rotating the same, a disk fixed to the crank shaft and an arcuate ground engaging propelling foot carried by the disk.

2. In a manually propelled sled, a pair of runners, a seat mounted on the runners, a manually operated ground engaging propelling foot beneath the seat, a cross rod connecting the forward ends of the runners, a block carrying a steering and braking foot pivoted on the rod and a foot operated plate connected to the foot for laterally shifting the same.

3. In a manually propelled sled, a pair of runners, a seat mounted on the runners, manually operated ground engaging propelling feet beneath the seat, a cross rod connecting the forward ends of the runners, a block carrying a steering and braking foot pivoted on the rod, a foot operated plate connected to the foot for laterally shifting the same, and cooperating devices carried by the rod, block and foot plate for limiting movement of the foot.

4. A sled comprising a pair of runners, a seat supported on the runners, manually operable ground engaging propelling feet beneath the seat, a cross rod connecting the forward ends of the runners, a block journalled on the cross rod, a combined steering and braking foot journalled in the block and means carried by the foot for operating the same.

5. A sled comprising a pair of runners, a seat supported on the runners, manually operable ground engaging propelling feet beneath the seat, a cross rod connecting the forward ends of the runners, a block journalled on the cross rod, a combined steering and braking foot journalled in the block and means carried by the foot for operating the same including a plate and arms carried by the plate attached to the foot at opposite sides of the block.

6. A sled comprising a pair of runners, a seat supported on the runners, a cross rod connecting the forward ends of the runners, a block journalled on the cross rod, a combined steering and braking foot journalled in the block and means carried by the foot for operating the same.

In testimony whereof we affix our signatures.

WALTER A. TAYLOR.
JOHN BOOSH.